(12) United States Patent
Minow

(10) Patent No.: US 6,226,719 B1
(45) Date of Patent: May 1, 2001

(54) ORGANIZING MEMORY EXTENTS OF OS INPUT/OUTPUT CONTROL

(75) Inventor: Martin Minow, San Francisco, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/075,408

(22) Filed: May 8, 1998

(51) Int. Cl.⁷ ...................................... G06F 13/16
(52) U.S. Cl. ............................ 711/154; 711/112
(58) Field of Search ............................ 711/111, 112, 154

(56) References Cited

U.S. PATENT DOCUMENTS 5,909,559 * 6/1999 So ........................................ 395/307
6,021,462 * 2/2000 Minow et al. ........................ 711/114

* cited by examiner

Primary Examiner—Kevin L. Ellis
(74) Attorney, Agent, or Firm—The Hecker Law Group

(57) ABSTRACT

The present invention provides an improved method for memory accesses. The invention uses on an object referred to as a MemoryContainer object that contains the location and length of each memory transfer segment. An object referred to as a MemoryDescriptor object contains an index that locates the current position of the transfer and references one or more MemoryContainers. This separates the scatter-gather list and the processing information into two, independent, objects that are optimized for their particular task. Having separate containers and descriptors permits combining containers and descriptors into larger collections. When a client wants to start a memory operation, it provides the memory location. A MemoryDescriptor and a MemoryContainer are instantiated and returned to the server. The MemoryDescriptor asks the MemoryContainer for the number of ranges that the container has (usually one or more ranges). The MemoryDescriptor is expected to wire the memory to make sure that the memory is resident for all memory in all ranges. The MemoryDescriptor can then request the starting address and length of each range and implement the memory operation. The object-oriented design permits more complex memory organizations, such as scatter-gather lists or RAID configurations to be processed by a device driver without regard to the underlying complexity of the memory organization.

6 Claims, 3 Drawing Sheets

ORGANIZING MEMORY EXTENTS OF OS INPUT/OUTPUT CONTROL

BACKGROUND OF THE INVENTION

1. Field of the Invention

This invention relates to the field of managing memory in a distributed computer system architecture.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

A computer system may include an input output subsystem (I/O system) where a high level device such as a processor, a high level device driver or even a software application communicates through the I/O to a peripheral device. The communication takes place through a device driver. The high level device is referred to here as a client and the low level device is referred to here as a server. One type of communication is a memory access involving the reading of data from, or writing of data to, a memory.

One prior art scheme of memory access uses a scatter gather scheme. Such schemes involve writing to a memory block data that has been gathered from non-contiguous memory locations, or writing to non-contiguous data locations data from a memory block. One method of accomplishing scatter gather memory operations is to create a list of the non-contiguous memory blocks to be written. The list is comprised of memory "extents" (memory transfer segments) and is called a scatter gather list. In the prior art, the scatter gather list is a table of words. It contains the set of addresses of the data to transfer and the lengths of each individual extent. The server then uses the scatter gather table to organize and process the transfer operation.

A disadvantage of prior art scatter gather schemes is illustrated in FIG. 2 with respect to a RAID memory subsystem. A RAID system is a "Redundant Array of Inexpensive Disks" and is used to increase system performance and reliability by breaking up data into stripes on different disks. In some RAID configurations, if part of the data is missing, it can be reconstructed from the remaining stripes. Other RAID configurations improve performance by transferring data to or from multiple physical units such as disk devices in parallel.

Referring to FIG. 2, a client has associated memory represented by memory cloud 201. A server (driver 202) wants to write some subset of the memory to a RAID array 203 (consisting of drives 203A, 203B, and 203C). The data to be written is described at the client side by a series of logical address locations represented by memory chunks 201A, 201B, and 201C. A first scatter gather list is generated that represents the addresses of the data and is represented by memory extents 204A, 204B, 204C, 204D, and 204E. To write the data into the RAID array, the memory extents are further subdivided by the server into smaller memory extents represented by memory extents 205A through 205I. (The number of extents and the ratio of extents to a previous set of extents or memory locations is given by way of example only, it may be far greater, for example). A disadvantage of prior art schemes is that each scatter-gather list requires the use of scarce memory resources and adds to the complexity of memory transfers. (Note that in a modern memory system, a single memory extent such as 201A may be located in several physical memory extents such as 204A, 204B, etc.)

SUMMARY OF THE INVENTION

The present invention provides an improved method for memory accesses. The invention uses an object referred to as a MemoryContainer object that contains the location and length of each memory transfer segment. An object referred to as a MemoryDescriptor object contains an index that locates the current position of the transfer and references one or more MemoryContainers. The invention separates the scatter-gather list and the processing information into two, independent, objects that are individually optimized for their particular task. Having separate containers and descriptors permits combining containers and descriptors into larger collections. When a client wants to start a memory operation, it provides the memory location or a scatter gather list of memory locations as designated by the client. A MemoryDescriptor and a MemoryContainer are instantiated and returned to the server. In some implementations, the client may provide the MemoryContainer. The MemoryDescriptor is expected to wire the memory to make sure that the memory is resident for all memory in all ranges. Before beginning the transfer, the operating system causes all memory described by the MemoryContainer to become resident in physical memory. The MemoryDescriptor can then request the starting physical address and length of each range and implement the memory operation. In a current "virtual memory" operating system, a single address range as seen by the client or defined by the MemoryContainer may occupy a potentially large number of discontiguous physical address ranges.

DETAILED DESCRIPTION OF THE INVENTION

The invention is a method and apparatus for providing and managing memory extents in a distributed computer system architecture. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The present invention separates the scatter-gather list and the processing information into two, independent, objects that are optimized for their particular task. One object is referred to here as a MemoryContainer object, and the other object is referred to as a MemoryDescriptor object.

The MemoryContainer object contains a specification of the memory addresses extents called "ranges" that define the location and length of each transfer segment, the number of such extents, and any operating-system specific information needed to locate these extents within the operating system's overall memory organization. The MemoryDescriptor object references one or more MemoryContainer objects and contains, at least, an index that locates the current position of the transfer within the overall list of memory extents.

Figure 3:
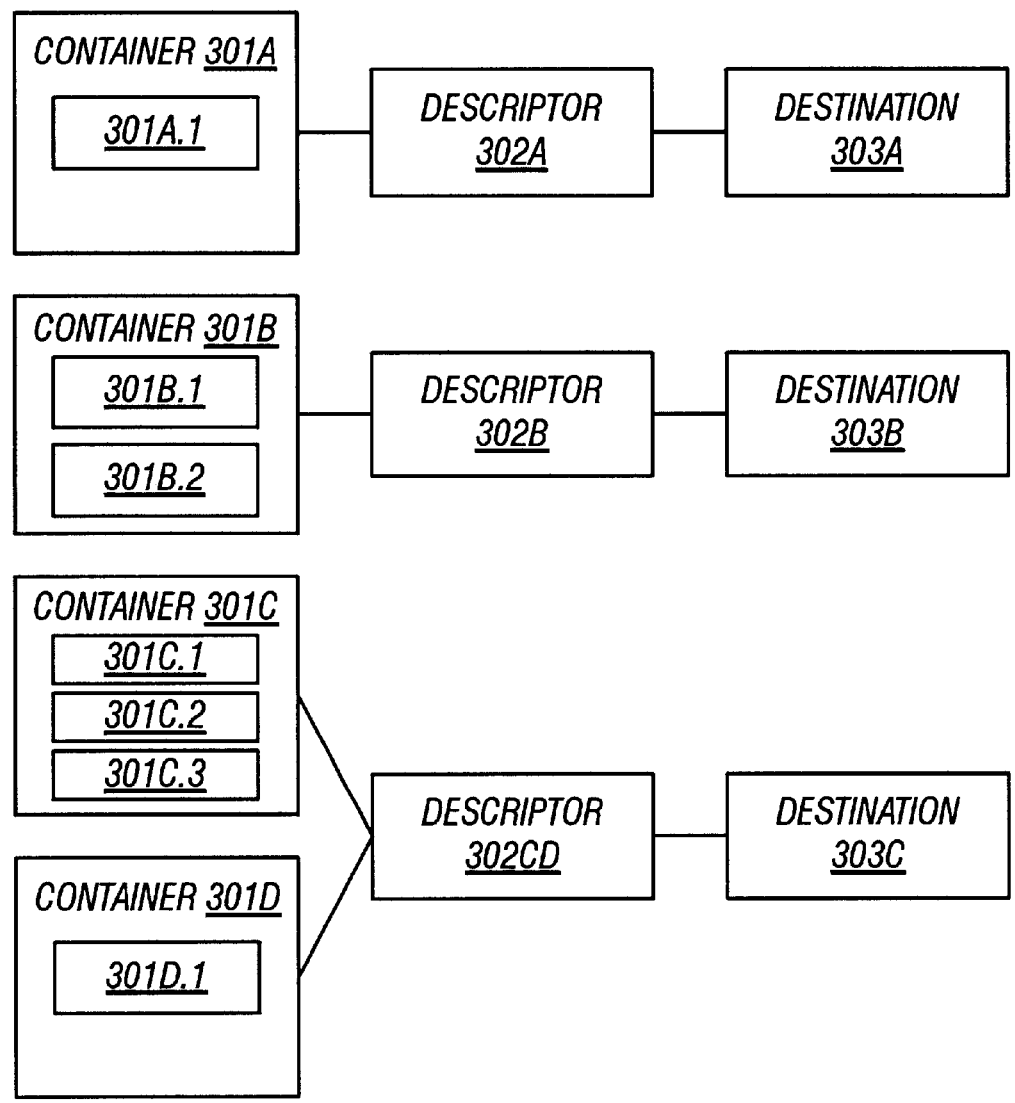
FIG. 3 illustrates one embodiment of the invention.

A diagrammatic representation of the invention is illustrated in FIG. 3. An application initiates a memory operation that will access destinations 303A, 303B, and 303C. (These destinations may be volumes in a RAID array, for example). The invention creates one or more memory containers for a memory operation. In a simple example, a single MemoryContainer object 301A is instantiated, along with a single MemoryDescriptor object 302A. In one embodiment of the invention, there is one descriptor for each destination device. The MemoryContainer 301A includes a memory range 301A.1 consisting of an address and length. The MemoryDescriptor 302A object contains the information necessary for processing the memory operation.

A MemoryContainer may have more than one memory range, such as ranges 301B.1 and 301B.2 of MemoryContainer 301B, and ranges 301C.1, 301C.2, and 301C.3 of MemoryContainer 301C. In addition, a single MemoryDescriptor can reference more than one MemoryContainer. For example, MemoryDescriptor 302CD references MemoryContainers 301C and 301D. It will be apparent, however, to one skilled in the art, that this design can be extended such that a MemoryDescriptor may reference a more complex structure of MemoryDescriptor and MemoryContainer instances.

Because the invention refers to object oriented objects, a summary of object oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. Some programming languages also provide a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of components under a component model definition.

Embodiment of Computer Execution Environment (Hardware)

Figure 1:
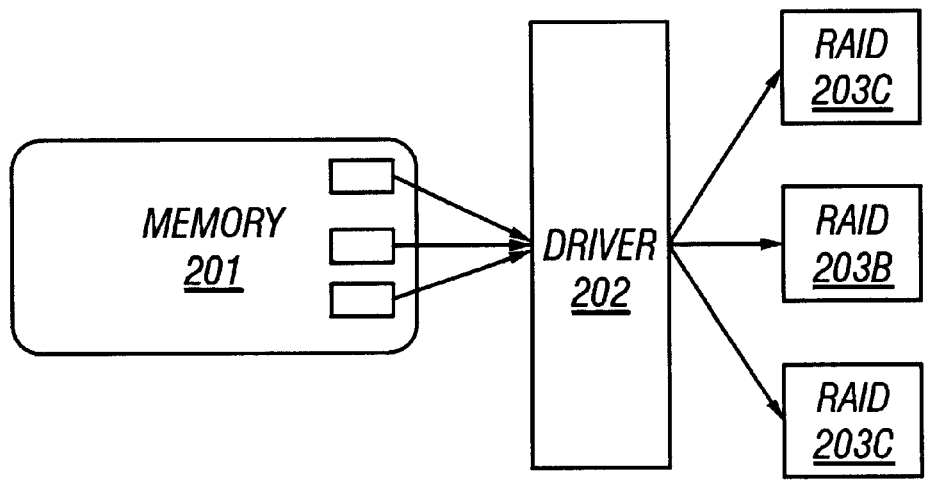
FIG. 1 illustrates an example computer system for implementing the present invention.
Figure 2:
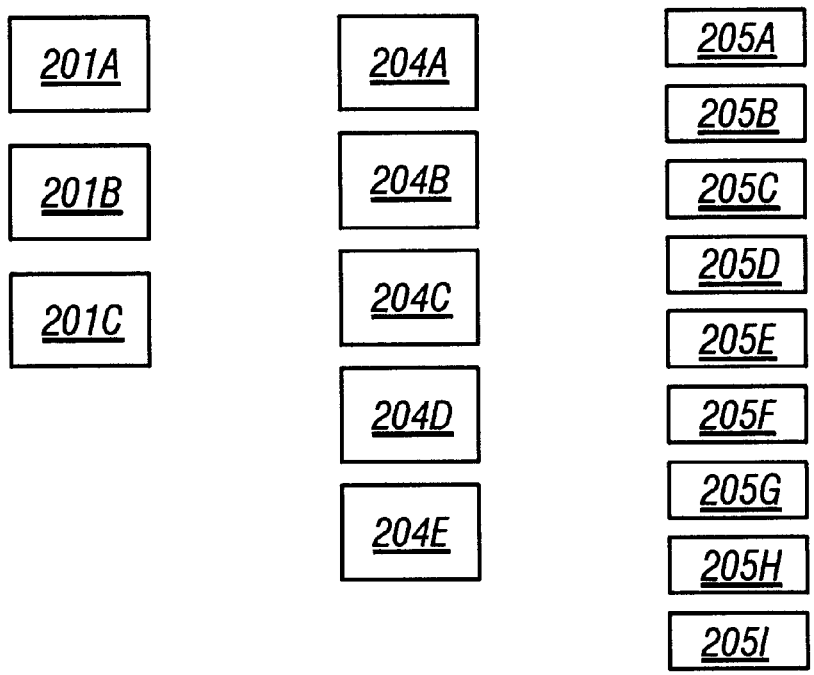
FIG. 2 illustrates an example of a RAID system and memory extents for a data access operation.

An embodiment of the invention can be implemented as computer software in the form of computer readable code executed on a general purpose computer such as computer 100 illustrated in FIG. 1, or in the form of bytecode class files running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

MemoryContainers

The MemoryContainer defines the memory that participates in an I/O request and supports I/O access (from a single server). The client constructs this object implicitly by creating a MemoryDescriptor. Once created, clients and servers do not manipulate the MemoryContainer object directly. This permits a single MemoryContainer to be shared among several MemoryDescriptors, which simplifies certain input/output control operations such as RAID.

A MemoryContainer object is an object that contains a specification of the memory addresses extents called "ranges" that define the location and length of each transfer segment, the number of such extents, and any operating-system specific information needed to locate these extents within the operating system's overall memory organization. This latter information may include task identification, privilege and protection information, and memory residency information. These memory addresses are here called "logical addresses" to distinguish them from hardware-specific addresses used for direct memory access transfers. A client process does not know, and cannot directly determine, the physical addresses associated with its addressable memory. In an embodiment of the invention, the MemoryContainer object does not contain any information regarding the ongoing transfer (such as the number of bytes transferred).

The MemoryContainer object supports the following operations:

1. Initialization—The client process provides the list of memory address ranges that will take part in the transfer. The MemoryContainer object is then initialized. Once initialized (and ignoring retention/release operations), the Memory-Container is unchanged during its lifetime.

2. The container object supports procedures that provide access to certain values used by the MemoryContainer object, such as the actual number of memory ranges and the total number of bytes to transfer.

3. The MemoryContainer object supports a procedure that returns the memory range at a particular index, where the index ranges from the initial index to the number of ranges. This procedure should return a specific value if the index does not refer to a valid memory range.

4. The MemoryContainer object supports procedures that associate a MemoryContainer with the information needed to locate the range owner (the "task" or "process") and, by implication, that owner's privileges. This information may be operating system specific.

5. If needed by the operating system, procedures may be needed to control a MemoryContainer or specific range's residence in physical memory for "Direct Memory Access."

6. In one embodiment, the MemoryContainer object does not provide information as to the current location of the transfer itself.

In addition to these operations, one implementation provides operations managing retention and release of the memory used by the MemoryContainer itself. These may be used when a single MemoryContainer is part of a larger collection of MemoryContainer and MemoryDescriptor objects.

The MemoryContainer object may be defined, for example, by the following Objective C interface. In this example, a number of the public methods are shown. In other embodiments, additional methods for administration, performance, and programmer convenience may be provided.

```
/*
 * The MemoryContainer describes the client memory. It is constructed
 * and manipulated by MemoryDescriptor classes.
 */
@interface MemoryContainer : Object
/**
 * Create a MemoryContainer object for a logical scatter-gather list in the
 * caller's address map.
 */
- (id)                       initWithIORange
                             : (const IORange *) ioRange
             count           : (unsigned int) count
             byReference     : (BOOL) byReference;
/**
 * Create a MemoryContainer object for a single logical range in the
 * caller's address map.
 */
- (id)                       initWithAddress
                             : (void *) address
             length          : (unsigned int) length;
/**
 * Manage the retain/release reference count.
 */
- (unsigned int)             retainCount;
- (id)                       retain;
- (oneway void)              release;
/**
 * Accessor methods
 */
- (unsigned int)             rangeCount;
- (unsigned int)             totalByteCount;
/**
 * Return the logical address and length for the i'th logical range.
 * Return IO_R_INVALID_ARG if the index is outside the allocated range.
 */
- (IOReturn)                 logicalRange
                             : (IORange *) logicalRange
             index           : (unsigned int) index;
/**
 * Make the memory described by this MemoryContainer resident.
 */
- (IoReturn)                 wireMemory
                             : (BOOL) forReading;
/**
 *Make the memory described by this underlying MemoryContainer pageable.
 */
- (IOReturn)                 unwireMemory;
@end /* MemoryContainer */
© Apple Computer, Inc. 1997/98
```

MemoryDescriptor

Clients create a MemoryDescriptor to define the memory used to satisfy an I/O request and to provide an access point for the actual memory transfer operation. A single MemoryDescriptor will be used for simple (non RAID) transfers, while a group or MemoryDescriptors, possibly organized into a hierarchy, will typically be used for RAID transfers.

The MemoryDescriptor object is an object that references one or more MemoryContainer objects and contains an index that locates the current position of the transfer within the overall list of memory extents. In one embodiment, a MemoryDescriptor may reference a MemoryContainer object or other MemoryDescriptor objects.

In one embodiment of the present invention, the MemoryDescriptor object supports the following operations.

1. Initialization—The MemoryDescriptor is initialized to contain one or more MemoryContainers. The residency information for each associated MemoryContainer is incremented. In one implementation the MemoryDescriptor may also retain operating system and hardware-specific information such as the maximum number of bytes that can be transferred in a single transfer.

2. The MemoryDescriptor object supports procedures that provide access to certain values used by the MemoryDescriptor, such as the current position in the transfer and the total number of bytes in the transfer.

3. The MemoryDescriptor object supports a procedure to reposition the transfer, either to a specific position or relative to the current transfer position.

4. The MemoryDescriptor object supports procedures to retrieve and initialize the current state of the transfer. These are variants of the reposition procedure that may record additional private information. In a complex collection of MemoryDescriptors and MemoryContainers, repositioning the transfer may require significant computation that is omitted by retaining additional state data. This is used to "bookmark" a transfer for error recovery and device management.

5. The MemoryDescriptor object supports a procedure to return one or more logical address ranges, starting at the current transfer position. The process calling this procedure controls the maximum number of ranges, the maximum length of each range, and the maximum number of bytes to return in all ranges. Note that, for some operating system architectures that provide multiple independent address spaces, a logical address range, by itself, may not allow the server (low-level device driver) process to directly access the client (application program) memory. Instead, the values returned by this procedure will be used, together with other operating-system specific information, to derive physical addresses or as part of a programmed transfer between address spaces as noted below.

6. The MemoryDescriptor object supports a procedure to return one or more physical address ranges, starting at the current transfer position. The process calling this procedure controls the maximum number of ranges, the maximum length of each range, and the maximum number of bytes to return in all ranges. This procedure is valid only if the ranges have been fixed in physical memory by the appropriate procedure in the underlying MemoryContainer.

7. The MemoryDescriptor object supports utility procedures to transfer data between memory addresses in the caller's address space and memory addresses in the client's address space as defined by the MemoryDescriptor and its underlying MemoryContainers. These are used for error recovery and for programmed transfers to support certain hardware architectures.

In addition to these operations, there may be operations managing retention and release of the memory used by the MemoryDescriptor itself and any MemoryDescriptors or MemoryContainers that it references. These are used when a single MemoryDescriptor is part of a larger collection of MemoryDescriptor objects.

The MemoryDescriptor object may be defined, for example, by the following Objective C interface. In this example, certain public methods are shown. In another embodiment, additional methods for administration, performance, and programmer convenience may be provided.

```
/*
 * The MemoryDescriptor uses a MemoryContainer to describe client memory
 * and provides an access point that can be used to control a data transfer.
 */
typedef struct PhysicalRange {
        void *          address;    /* Physical range start */
        unsigned int    length;     /* Length of this range */
} PhysicalRange;
/**
 * Initialize a MemoryDescriptor object for a logical scatter-gather list.
 */
- (id)                  initWithIORange
                        : (const IORange *) ioRange
        count           : (unsigned int) count
        byReference     : (BOOL) byReference;
/**
 * Initialize a MemoryDescriptor object for a single logical range.
 */
- (id)                  initWithAddress
                        : (void *) address.
        length          : (unsigned int) length;
/**
 * Manage the retain/release reference count.
 */
- (unsigned int)        retainCount;
- (id)                  retain;
- (oneway void)         release;
/**
 * Accessor methods
 */
- (unsigned int)        currentOffset;
- (unsigned int)        totalByteCount;
- (unsigned int)        maxSegmentCount;
- (id)                  memoryContainer;
- (vm_task_t)           client;
- (void)                setMaxSegmentCount
                        : (unsigned int) newMaxSegmentCount;
- (void)                setClient
                        : (vm_task_t) client;
- (void)                setMemoryContainer
                        : (id) memoryContainer;
/**
 * Set the current access point to the specified byte index.
 */
- (void)                setPosition
                        : (unsigned int) newPosition;
/**
 *Change the current access point by a relative offset.
 */
- (void)                setRelativePosition
                        : (signed int) offset;
/**
 * Return one or more logical ranges. Return the total number of bytes in all
 * ranges. Return zero if the current position is beyond the end of the range.
 */
- (unsigned int)        getLogicalRanges
                        : (unsigned int) maxRanges
        maxByteCount    : (unsigned int) maxByteCount
```

-continued

```
            newPosition    : (unsigned int *) newPosition
            actualRanges   : (unsigned int *) actualRanges
            logicalRanges  : (IORange *) logicalRanges;
/*
 * Return one or more physical ranges. Return zero if the transfer is outside
 * of the defined range (I.e., if all data has been transferred).
 */
- (unsigned int)            getPhysicalRanges
                            : (unsigned int) maxRanges
            maxByteCount    : (unsigned int) maxByteCount
            newPosition     : (unsigned int *) newPosition
            actualRanges    : (unsigned int *) actualRanges
            physicalRanges  : (PhysicalRange *) physicalRanges;
/**
 * Copy bytes from the caller's address space to the MemoryContainer
 * client address space. Return the actual number of bytes transferred.
 */
- (unsigned int)            writeToClient
                            : (void *) buffer
            count           : (unsigned int) count;
/**
 * Copy bytes from the MemoryContainer client's address space to the
 * caller's address space. Return the actual number of bytes transferred.
 */
- (unsigned int)            readFromClient
                            : (void *) buffer
            count           : (unsigned int) count;
/**
 * Make the memory described by this MemoryDescriptor resident.
 */
- (IOReturn)                wireMemory
                            : (BOOL) forReading;
/**
 * Make the memory described by this underlying MemoryDescriptor pageable.
 */
- (IOReturn)                unwireMemory;
@end /* MemoryDescriptor : Object */
© Apple Computer, Inc. 1997/98
```

MemoryStripe Object

In some I/O transfers (e.g. a RAID operation) a MemoryStripe object may be instantiated to satisfy a striped request that is managed by the server directly. The MemoryStripe object is a subclass of the MemoryDescriptor object. The MemoryStripe object may be defined, for example, by the following Objective C interface. In this example, certain public methods are shown for a RAID configuration. In another embodiment, additional methods for administration, performance, and programmer convenience and more complex RAID configurations could require different parameters. Since the MemoryStripe object is a subset of the MemoryDescriptor object, all public methods exported by the MemoryDescriptor are also provided by MemoryStripe objects. A device driver (server) uses the exported methods to manage an ongoing data transfer and, because the object implementation is opaque, need not be concerned with the particular memory organization or RAID configuration.

```
@interface Memoryβtripe : MemoryDescriptor
- (id)                      initWithMemoryDescriptor
                            : (MemoryDescriptor) memoryDescriptor;
- (void) setStripeParameters
                            : (ByteCount) stripeInitialOffset
            transfer        : (ByteCount) stripeTransferCount
            skip            : (ByteCount) stripeSkipCount;
/*
 * Accessor and repositioning methods are defined by the
 * MemoryDescriptor parent class. Accessors for the
 * stripe-specific parameters are not shown for convenience.
 */
@end /* Memoryβtripe : MemoryDescriptor */
© Apple Computer, Inc. 1997/98
```

Operation

In a typical operation, a single data transfer has a single memory extent, instantiated within a single MemoryContainer, and described by a single MemoryDescriptor. However this design can accommodate a number of more complex organizations. Furthermore, a particular implementation may provide an optimized implementation of the typical case by combining a MemoryContainer and MemoryDescriptor into a single SimpleMemoryDescriptor object that is a subclass of the MemoryDescriptor class.

Because the server only references the public MemoryDescriptor methods, it does not need to recognize this typical case.

A MemoryContainer may describe multiple independent memory extents. This is useful when the client process wishes to distribute the transfer into independent areas within its application space. In some applications, such as scanning printed material, a single request to the operating system may describe over 2000 independent memory areas.

One MemoryContainer may be shared among several MemoryDescriptor objects. This is useful in RAID ("Redundant Array of Inexpensive Disks") configurations where transfers from several hardware devices are directed to a single client's MemoryContainer. One MemoryDescriptor may refer to multiple MemoryContainers. One MemoryDescriptor may reference one or more MemoryDescriptors to derive the actual MemoryContainer(s) and, hence, the actual memory addresses and transfer lengths that it will use to process the request. These, too, are useful for RAID configurations.

The "index" that determines the current locations of the transfer may include the MemoryContainer or subsidiary MemoryDescriptor reference and additional indexing information.

A MemoryDescriptor object is constructed by a client task and, in the simplest case, accessed by a server task. A flow diagram of the operation of the invention is illustrated in FIG. 4.

Figure 4:
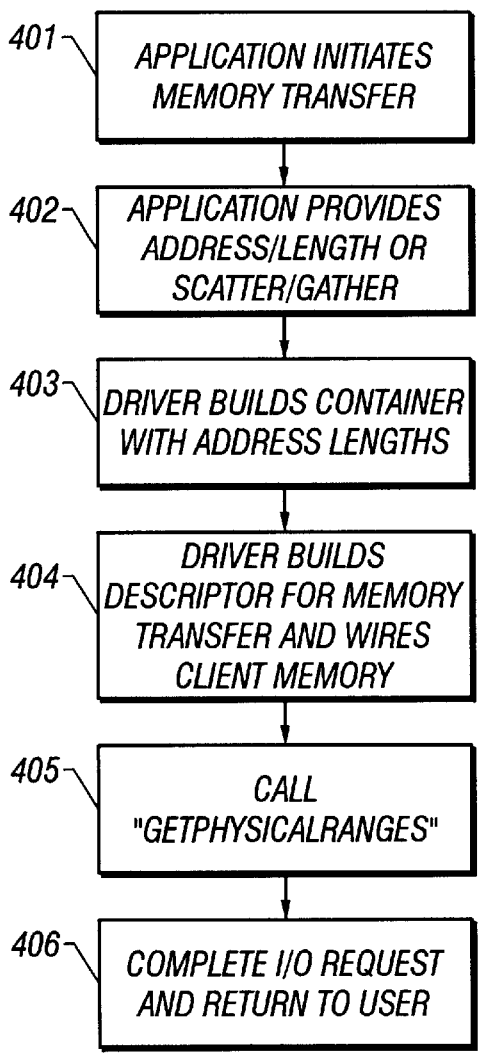
FIG. 4 is a flow diagram of the present invention.

Referring to FIG. 4, at step 401 an application initiates a memory transfer (a read or a write). At step 402 the application provides the address and length if a single memory extent is involved, or a scatter/gather list of ranges of memory if multiple extents are involved. At step 403 the high level device driver associated with the memory device builds a MemoryContainer with the address/length entry or scatter/gather list. At step 404 a MemoryDescriptor is built for processing the memory transfer and "wires" the client memory so that it occupies resident physical memory.

At step 405 the controller handling the transfer calls the "getPhysicalRanges" method from the descriptor. This returns a list of the actual physical addresses in the application's address space, along with the length of each physical address segment. This is passed to the memory hardware to retrieve the data. This continues until all memory ranges have been handled, remembering that the MemoryContainer provides information about the number of ranges it contains. At step 406 the I/O request is completed and data is returned to the user (application). (When the transfer completes the MemoryDescriptor and MemoryContainer objects are freed).

Striped Request

Figure 5:
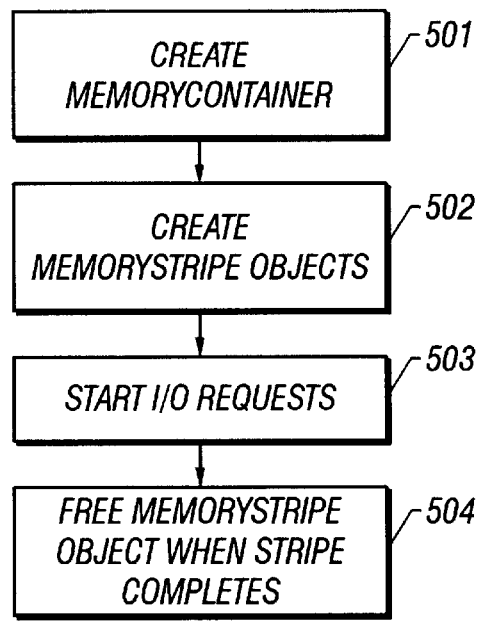
FIG. 5 is a flow diagram of an embodiment of the present invention.

The present invention can be used in a RAID environment by using MemoryStripe objects. Once constructed, a memoryContainer object may be shared by a number of MemoryStripe objects, each of which is associated with one instance of a collection of server tasks that collectively support a striped or mirrored (RAID) dataset. An overview of the flow of a striped I/O request is shown in FIG. 5.

At step 501 create a new MemoryContainer object that defines the processor memory that will participate in the I/O request. If this is a RAID dataset, create MemoryStripe objects at step 502 that reference the original MemoryContainer object. Each MemoryStripe defines a particular partitioning of the original request. At step 503 start all I/O requests (one for each MemoryStripe object). When ready to read or write data each stripe will get the next physical range and do the DMA transfer.

Recall that the MemoryStripe object is a subclass of the MemoryDescriptor object and, consequently, provides implementations of the MemoryDescriptor's public methods. The low-level, device-specific drive (server) uses the MemoryDescriptor methods to obtain the specific physical addresses and their lengths, as was shown in FIG. 4, step 405, and, consequently, is spared the complexity of the underlying stripe (RAID) computations.

When each stripe completes, free its MemoryStripe object at step 504. The last one freed will free the parent MemoryContainer object.

Read-only After Construction

Because the MemoryContainer may be shared among several MemoryDescriptor or MemoryStripe objects, it is initialized, except as needed to manage its reference counter.

Always Resident.

Of the virtual memory paging system itself, the MemoryContainer object, MemoryDescriptor object, and any MemoryStripe objects must be stored in memory that must remain permanently resident throughout the lifetime of the data transfer. Whether this will be necessary for any particular device drive or operating system will depend on the particulars of that specific device drive and/or operating system.

Performance Considerations

Access during "normal" front-to-back I/O is critical-path. Repositioning will be slower for complex scatter-gather lists. For some device drivers, a fast save and restore context method will be useful.

Thus, a method and apparatus for creating and managing memory extents in a distributed computer system architecture has been described.

What is claimed is:

1. A method for performing a memory transfer comprising the steps of:

initiating a memory transfer;

determining the logical address and length of at least one memory segment;

instantiating a memory container object and providing said address and length to said memory container object;

instantiating a memory descriptor object, wherein said memory descriptor object references at least one said memory container object and contains an index that locates the current position of said memory transfer within at least one list of said memory transfer segments;

calling a method of said memory descriptor object to obtain a physical range of said at least one memory segment.

2. The method of claim 1 further including the steps of:

determining a logical address and length for each of a plurality of memory segments;

providing said logical address and length for each of said plurality of memory segments to said memory container object.

3. The method of claim 2 further comprising the steps of:

calling said method of said memory descriptor object to obtain a physical range for each of said plurality of memory segments.

4. An article of manufacture having computer readable program code comprising:

computer readable program code configured to cause a computer to initiate a memory transfer;

computer readable program code configured to cause a computer to determine the logical address and length of at least one memory segment;

computer readable program code configured to cause a computer to instantiate a memory container object and provide said address and length to said memory container object;

computer readable program code configured to cause a computer to instantiate a memory descriptor object, wherein said memory descriptor object references at least one said memory container object and contains an index that locates the current position of said memory transfer within at least one list of said memory transfer segments;

computer readable program code configured to cause a computer to call a method of said memory descriptor object to obtain a physical range of said at least one memory segment.

5. The article of manufacture of claim 4 further including:

computer readable program code configured to cause a computer to determine a logical address and length for each of a plurality of memory segments;

computer readable program code configured to cause a computer to provide said logical address and length for each of said plurality of memory segments to said memory container object.

6. The article of manufacture of claim 5 further comprising:

computer readable program code configured to cause a computer to call said method of said memory descriptor object to obtain a physical range for each of said plurality of memory segments.

* * * * *